(12) United States Patent
Keith et al.

(10) Patent No.: US 8,726,675 B2
(45) Date of Patent: May 20, 2014

(54) SCALLOPED FLEXURE RING

(75) Inventors: William P. Keith, Lakewood, CA (US); Michael L. Hand, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 1197 days.

(21) Appl. No.: 11/851,667

(22) Filed: Sep. 7, 2007

(65) Prior Publication Data
US 2009/0064681 A1 Mar. 12, 2009

(51) Int. Cl.
*F02C 7/20* (2006.01)

(52) U.S. Cl.
USPC .................................. 60/799; 60/796; 60/800

(58) Field of Classification Search
USPC .................................... 60/770, 796, 799–800
See application file for complete search history.

(56) References Cited

U.S. PATENT DOCUMENTS

| | | | |
|---|---|---|---|
| 2,615,300 A * | 10/1952 | Lombard | ........................ 60/800 |
| 3,701,704 A | 10/1972 | Dervy | |
| 3,826,708 A | 7/1974 | Dervy | |
| 3,962,843 A | 6/1976 | King, Jr. | |
| 3,985,000 A | 10/1976 | Hartz | |
| 4,004,887 A | 1/1977 | Stormont | |
| 4,076,451 A | 2/1978 | Jankot | |
| 4,227,370 A * | 10/1980 | Kirker | ............................ 60/262 |
| 4,438,956 A | 3/1984 | Jones et al. | |
| 4,552,386 A | 11/1985 | Burchette | |
| 4,907,743 A | 3/1990 | Bouiller et al. | |
| 4,910,620 A | 3/1990 | Olbrich | |
| 5,013,174 A | 5/1991 | Marabotto et al. | |
| 5,074,697 A | 12/1991 | Blanpain et al. | |
| 5,141,393 A | 8/1992 | Marra | |
| 5,147,151 A | 9/1992 | Hipkins, Jr. | |
| 5,230,539 A * | 7/1993 | Olson | ........................... 285/323 |
| 5,445,469 A | 8/1995 | Huck et al. | |
| 5,503,490 A | 4/1996 | Melton | |
| 5,504,798 A | 4/1996 | Suzuki | |
| 5,645,363 A | 7/1997 | Dafforn et al. | |
| 5,984,568 A | 11/1999 | Lohbeck | |
| 6,106,184 A | 8/2000 | Daniels et al. | |
| 6,158,961 A * | 12/2000 | Kehl et al. | ................. 416/193 A |
| 6,173,996 B1 | 1/2001 | Derakhshan et al. | |
| 6,179,559 B1 * | 1/2001 | Weaver | ......................... 415/161 |
| 6,212,753 B1 | 4/2001 | Derakhshan et al. | |

(Continued)

FOREIGN PATENT DOCUMENTS

| | | |
|---|---|---|
| EP | 1439350 | 7/2004 |
| EP | 1607582 | 12/2005 |
| EP | 1775517 | 4/2007 |
| FR | 2875854 | 3/2006 |

OTHER PUBLICATIONS

United States Patent and Trademark Office, "Final Office Action," issued in connection with U.S. Appl. No. 12/783,599, mailed Apr. 13, 2012, 16 pages.

(Continued)

*Primary Examiner* — Andrew Nguyen
(74) *Attorney, Agent, or Firm* — Hanley, Flight & Zimmerman, LLC.

(57) ABSTRACT

A scalloped flexure ring. An illustrative embodiment of the flexure ring includes a ring body having a first ring body edge and a generally scalloped second ring body edge and a plurality of spaced-apart ring fingers provided in the second ring body edge.

20 Claims, 4 Drawing Sheets

(56) References Cited

U.S. PATENT DOCUMENTS

| | | | |
|---|---|---|---|
| 6,540,899 B2 * | 4/2003 | Keigler | 205/118 |
| 6,607,328 B1 | 8/2003 | Treiber et al. | |
| 6,644,034 B2 | 11/2003 | Ariyoshi et al. | |
| 6,658,853 B2 | 12/2003 | Matsuda et al. | |
| 6,668,559 B2 | 12/2003 | Calvez et al. | |
| 6,708,495 B2 | 3/2004 | Calvez et al. | |
| 6,759,386 B2 | 7/2004 | Franco | |
| 6,775,985 B2 | 8/2004 | Mitchell et al. | |
| 6,904,757 B2 | 6/2005 | Mitchell et al. | |
| 7,017,350 B2 * | 3/2006 | De Sousa et al. | 60/796 |
| 7,234,306 B2 | 6/2007 | Aumont et al. | |
| 7,237,387 B2 * | 7/2007 | Aumont et al. | 60/796 |
| 7,237,388 B2 | 7/2007 | Aumont et al. | |
| 8,141,370 B2 | 3/2012 | Bulman et al. | |
| 8,328,453 B2 | 12/2012 | Keith et al. | |
| 8,424,312 B2 | 4/2013 | Conete et al. | |
| 8,459,941 B2 | 6/2013 | Jasko et al. | |
| 2002/0108378 A1 | 8/2002 | Ariyoshi et al. | |
| 2003/0091386 A1 | 5/2003 | Ting | |
| 2004/0134198 A1 | 7/2004 | Mitchell et al. | |
| 2006/0010879 A1 | 1/2006 | Aumont et al. | |
| 2006/0032236 A1 | 2/2006 | Aumont et al. | |
| 2006/0032237 A1 | 2/2006 | Aumont et al. | |
| 2007/0240423 A1 | 10/2007 | Bulman et al. | |
| 2008/0115484 A1 | 5/2008 | Conete et al. | |
| 2009/0064681 A1 | 3/2009 | Keith et al. | |
| 2009/0067917 A1 | 3/2009 | Keith et al. | |
| 2010/0227698 A1 | 9/2010 | Keith et al. | |
| 2013/0223982 A1 | 8/2013 | Durocher et al. | |

OTHER PUBLICATIONS

United States Patent and Trademark Office, "Final Office Action," issued in connection with U.S. Appl. No. 11/851,622, mailed Mar. 23, 2010, 22 pages.

United States Patent and Trademark Office, "Non-Final Office Action," issued in connection with U.S. Appl. No. 11/851,622, mailed Oct. 26, 2009, 14 pages.

United States Patent and Trademark Office, "Advisory Action," issued in connection with U.S. Appl. No. 11/851,622, mailed Sep. 17, 2009, 4 pages.

United States Patent and Trademark Office, "Final Office Action," issued in connection with U.S. Appl. No. 11/851,622, mailed Jul. 8, 2009, 17 pages.

United States Patent and Trademark Office, "Non-Final Office Action," issued in connection with U.S. Appl. No. 11/851,622, mailed Jan. 8, 2009, 15 pages.

United States Patent and Trademark Office, "Restriction Requirement," issued in connection with U.S. Appl. No. 11/851,622, mailed Nov. 14, 2008, 8 pages.

United States Patent and Trademark Office, "Non-Final Office Action," issued in connection with U.S. Appl. No. 12/783,599, mailed Dec. 28, 2011, 13 pages.

United States Patent and Trademark Office, "Advisory Action," issued in connection with U.S. Appl. No. 12/783,599, mailed Nov. 29, 2011, 4 pages.

United States Patent and Trademark Office, "Final Office Action," issued in connection with U.S. Appl. No. 12/783,599, mailed Aug. 25, 2011, 12 pages.

United States Patent and Trademark Office, "Non-Final Office Action," issued in connection with U.S. Appl. No. 12/783,599, mailed May 13, 2011, 20 pages.

European Patent Office, "European Search Report," issued in connection with European application serial No. 08163806.6, mailed Mar. 19, 2012, 7 pages.

European Patent Office, "European Search Report," issued in connection with European application serial No. 08163818.1, mailed Mar. 26, 2012, 7 pages.

United States Patent and Trademark Office, "Notice of Allowance," issued in connection with U.S. Appl. No. 12/783,599, on Aug. 14, 2012 (7 pages).

United States Patent and Trademark Office, "Non-Final Office Action," issued in connection with U.S. Appl. No. 13/649,770, on Nov. 26, 2012 (15 pages).

United States Patent and Trademark Office, "Final Office Action," issued in connection with U.S. Appl. No. 13/649,770, on Mar. 28, 2013 (13 pages).

United States Patent and Trademark Office, "Non-Final Office Action," issued in connection with U.S. Appl. No. 13/649,770, on Sep. 17, 2013 (15 pages).

* cited by examiner

U.S. Patent    May 20, 2014    Sheet 1 of 4    US 8,726,675 B2

SCALLOPED FLEXURE RING

RELATED APPLICATIONS

This application is related to co-pending U.S. patent application Ser. No. 11/851,622, filed on Sep. 7, 2007.

TECHNICAL FIELD

The present disclosure relates to couplings. More particularly, the present disclosure relates to a scalloped flexure ring which is suitable for coupling a structure having a high CTE (coefficient of thermal expansion) to a structure having a low CTE.

BACKGROUND

In many applications, it may be necessary to couple a structure having a high coefficient of thermal expansion (CTE) to a structure having a low CTE such as in the coupling of a metallic structure and a ceramic structure, for example. However, the thermal mismatch between such structures may induce high strains in the ceramic if the structures are rigidly joined when the structures are heated. These forces may influence the ceramic structure, precluding the coupling of ceramic and metallic structures to each other in elevated temperature applications.

SUMMARY

The present disclosure is generally directed to a scalloped flexure ring. An illustrative embodiment of the flexure ring includes a ring body having a first ring body edge and a generally scalloped second ring body edge and a plurality of spaced-apart ring fingers provided in the second ring body edge.

The present disclosure is further generally directed to a propulsion system. An illustrative embodiment of the propulsion system includes an engine; a nozzle; and a scalloped flexure ring attaching the nozzle to the engine.

BRIEF DESCRIPTION OF THE ILLUSTRATIONS

DETAILED DESCRIPTION

Figure 1:
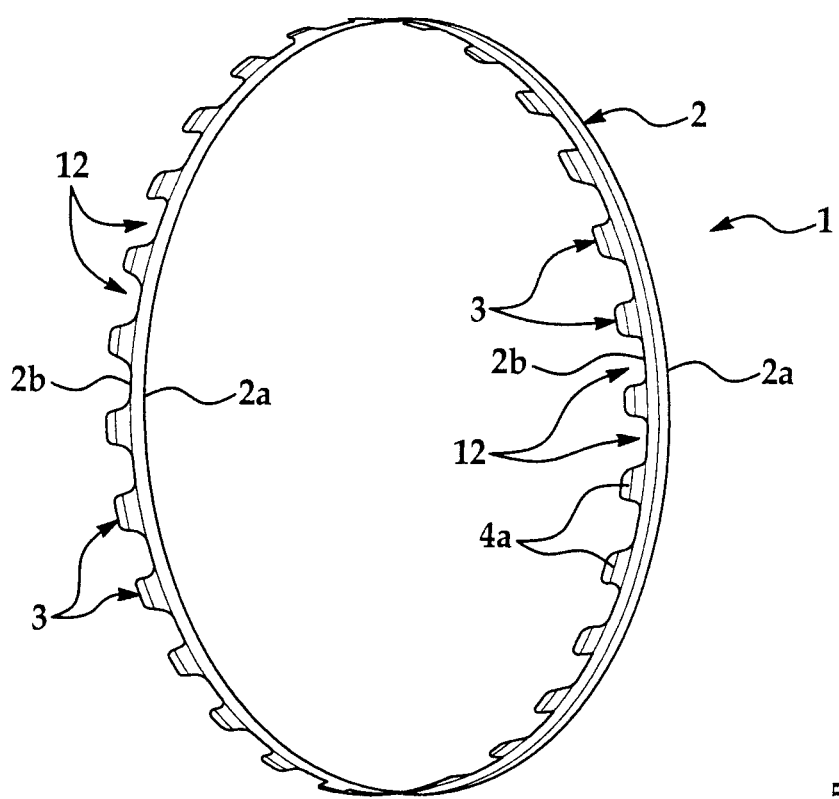
FIG. 1 is a perspective view of an illustrative embodiment of the scalloped flexure ring.
Figure 2:
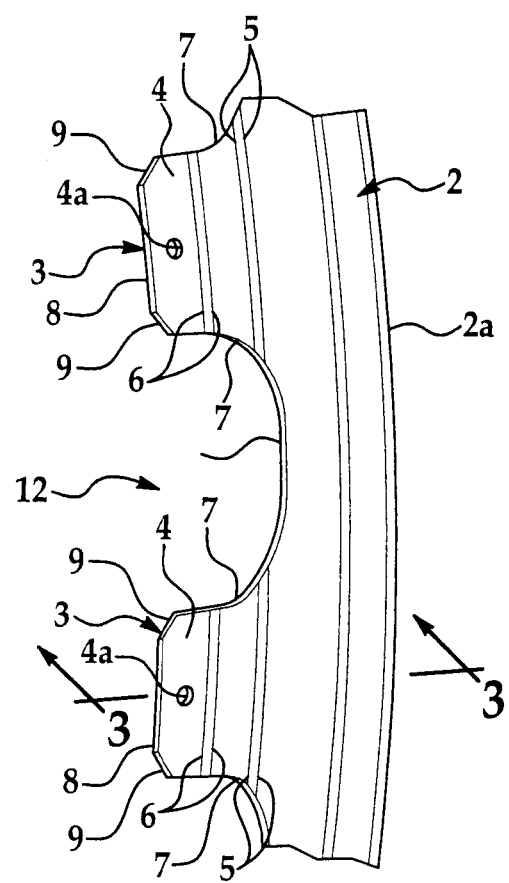
FIG. 2 is an enlarged sectional view of an illustrative embodiment of the scalloped flexure ring.
Figure 3:
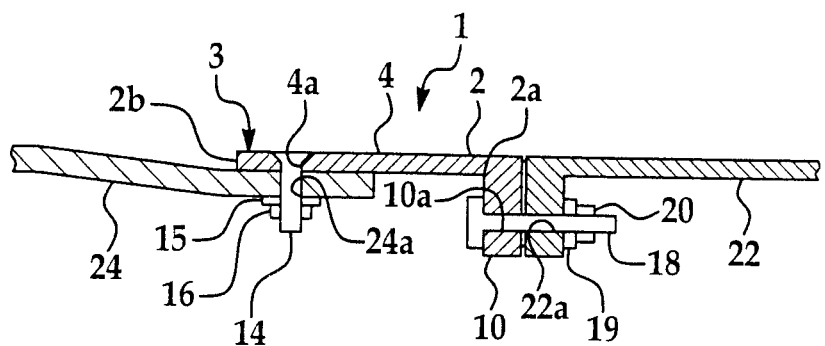
FIG. 3 is a cross-sectional view, taken along section lines 3-3 in FIG. 2, with the scalloped flexure ring attaching a structure having a high CTE to a structure having a low CTE.

Referring initially to FIGS. 1-3 of the drawings, an illustrative embodiment of the scalloped flexure ring, hereinafter flexure ring, is generally indicated by reference numeral 1. The flexure ring 1 may be metal such as titanium, for example and without limitation. As shown in FIG. 3, the flexure ring 1 may couple a structure having a relatively high CTE (coefficient of thermal expansion) 22 to a structure having a relatively low CTE 24 and facilitate relative thermal expansion and contraction of the high CTE structure 22 with respect to the low CTE structure 24 during heating and cooling cycles. The low CTE structure 24 may be ceramic, for example and without limitation. The high CTE structure 22 may have a coefficient of thermal expansion (CTE) which is higher than that of the low CTE structure 24.

As shown in FIGS. 1 and 2, the flexure ring 1 may include a ring body 2 which may be annular. The ring body 2 may have a first ring body edge 2a and a second ring body edge 2b. As shown in FIG. 3, a ring flange 10 may extend from the first ring body edge 2a of the ring body 2. In cross-section, the ring flange 10 may be oriented in generally perpendicular relationship with respect to the ring body 2. Multiple, spaced-apart flange fastener openings 10a (FIG. 3) may extend through the ring flange 10. The first ring body edge 2a of the ring body 2 may have a generally straight configuration. The second ring body edge 2b of the ring body 2 may have a generally scalloped configuration. Multiple ring fingers 3 may be provided in the second ring body edge 2b in spaced-apart relationship with respect to each other around the circumference of the ring body 2. As illustrated in FIG. 3, in cross-section each ring finger 3 may be oriented at a generally 180-degree angle with respect to the ring body 2 and in generally perpendicular relationship with respect to the ring flange 10. Ring notches 12 may be defined between the adjacent ring fingers 3.

As shown in FIG. 2, each ring finger 3 may have a finger body 4 which extends from the second ring body edge 2b of the ring body 2. At least one base flexure line 5 may be provided at or adjacent to the point or line of attachment between the finger body 4 of each ring finger 3 and the second ring body edge 2b. At least one finger body flexure line 6 may be provided in the finger body 4 in spaced-apart relationship with respect to the at least one base flexure line 5. The at least one base flexure line 5 and at least one finger body flexure line 6 may impart radial flexibility to the finger body 4 of each ring finger 3. At least one finger fastener opening 4a may extend through the finger body 4 of each ring finger 3.

Figure 9:
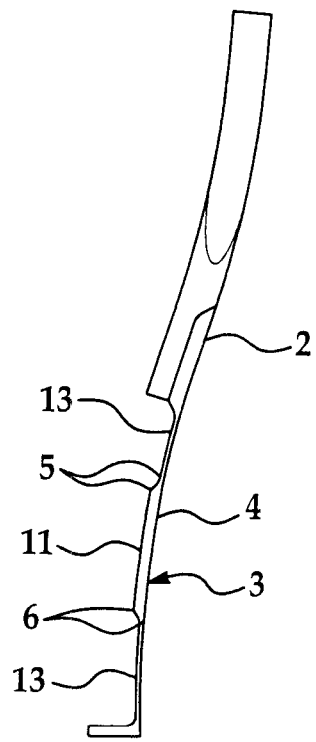
FIG. 9 is a sectional view of an illustrative embodiment of the scalloped flexure ring, more particularly illustrating finger flexures provided in each ring finger of the scalloped flexure ring.

A cross-sectional view of each ring finger 3 according to an illustrative embodiment of the scalloped flexure ring 1 is shown in FIG. 9. A finger flexure 13 is provided in each of the proximal and distal ends of the finger body 4 of each ring finger 3. A middle finger portion 11 may extend between the finger flexures 13. The middle finger portion 11 may have a thickness which is greater than each of the adjacent finger flexures 13 of the finger body 4 of each ring finger 3.

As shown in FIG. 2, the finger body 4 of each ring finger 3 may have a pair of side finger edges 7. The side finger edges 7 of each finger body 4 may each have a generally curved shape. The finger body 4 of each ring finger 3 may have a distal finger edge 8 which may be generally straight or axial. A finger bevel 9 may extend between the distal finger edge 8 and each corresponding side finger edge 7.

As shown in FIG. 3, in typical application, the flexure ring 1 may couple the structure having a high CTE 22 to the structure having a low CTE 24. A flange fastener 18 may be extended through each flange fastener opening 10a provided in the ring flange 10 and through a corresponding registering fastener opening 22a provided in the high CTE structure 22. A washer 19 and a securing nut 20 may be provided on each flange fastener 18. A finger fastener 14 may be extended through the finger fastener opening 4a provided in the finger body 4 of each ring finger 3 and through a corresponding registering fastener opening 24a provided in the low CTE structure 24. A washer 15 and a securing nut 16 may be provided on the finger fastener 14.

A fluid (not shown) having an elevated temperature may flow through the high CTE structure 22 and the low CTE structure 24. Due to its higher CTE, the high CTE structure 22 expands to a greater extent than the low CTE structure 24 upon heating due to flow of the typically hot fluid through the high CTE structure 22 and the low CTE structure 24. Accordingly, the ring fingers 3 facilitate axial and radial expansion of the high CTE structure 22 relative to the low CTE structure 24. The at least one base flexure line 5 (FIG. 2) and at least one finger body flexure line 6 may impart radial flexibility to the flexure ring 1. The flexure ring 1 is capable of withstanding shear forces which are directed tangentially to the circumference of the flexure ring 1 as well as loads which are directed parallel to the central axis of the flexure ring 1. Therefore, thermal stresses between the high CTE structure 22 and the low CTE structure 24 during thermal cycling is minimized, thus substantially preventing any possible change in the typically ceramic low CTE structure 24.

Figure 4:
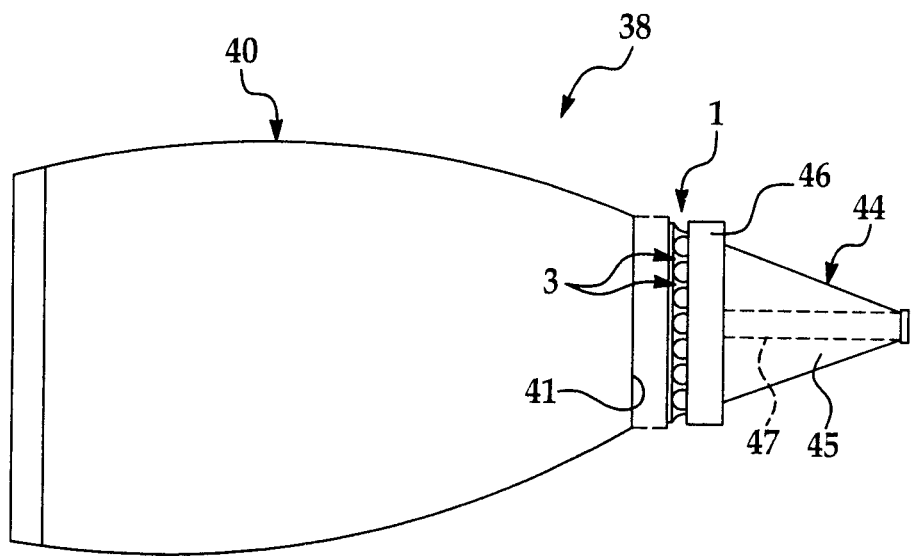
FIG. 4 is an exploded side view illustrating attachment of a nozzle to a turbine engine via an illustrative embodiment of the scalloped flexure ring.
Figure 5:
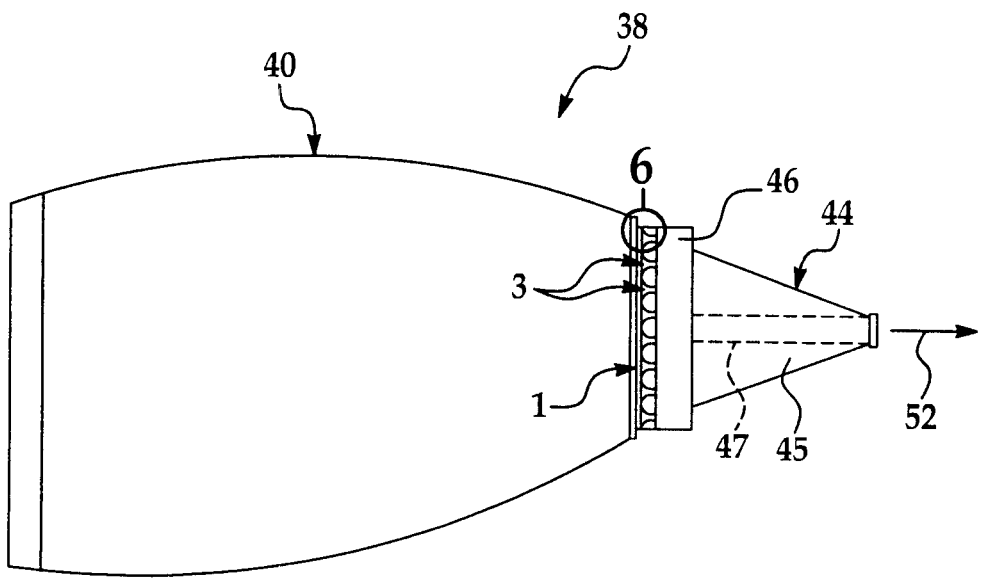
FIG. 5 is a side view with the nozzle attached to the turbine engine via the scalloped flexure ring.
Figure 7:
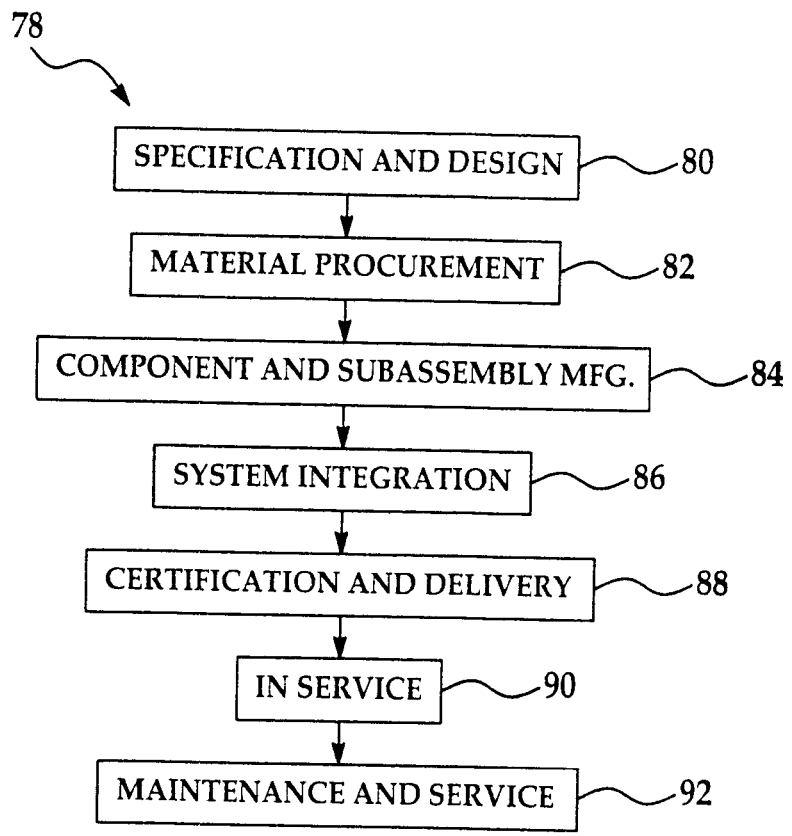
FIG. 7 is a flow diagram of an aircraft production and service methodology.
Figure 8:
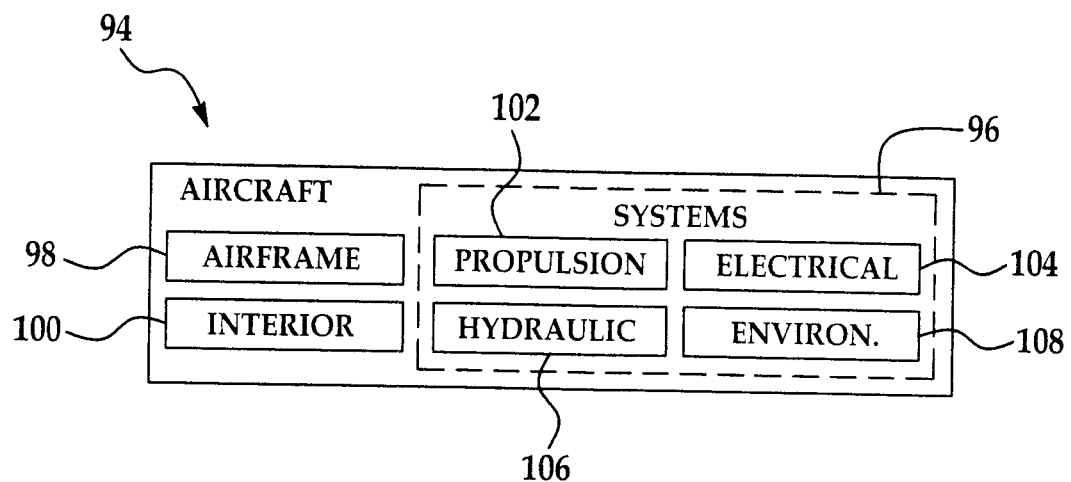
FIG. 8 is a block diagram of an aircraft.

Referring next to FIGS. 4 and 5, in one exemplary application the flexure ring 1 may attach a ceramic nozzle 44 to a mount structure 41 on a turbine engine 40 in a propulsion system 38. The turbine engine 40 may be conventional. As shown in FIGS. 7 and 8, the nozzle 44 may include a conical center body 45. An annular mount structure 46 may extend from the wide end of the center body 45. A center vent tube 47 (shown in phantom) may extend through the center body 45 and the mount structure 46 of the nozzle 44.

The ring flange 10 (FIG. 3) of the flexure ring 1 may be attached to the mount structure 41 of the turbine engine 40 using the finger fasteners 14. The ring fingers 3 of the flexure ring 1 may be attached to the mount structure 46 of the nozzle 44 using the flange fasteners 18, as was heretofore described with respect to FIG. 3.

Figure 6:
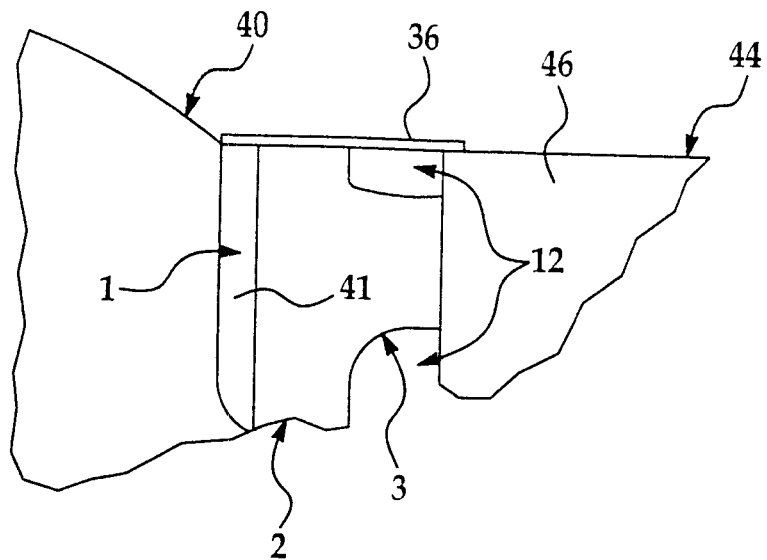
FIG. 6 is an enlarged sectional view, taken along section line 6 in FIG. 5.

As shown in FIG. 6, a seal strip 36 (shown in cross-section), which is a thermally-resistant material, may extend between the turbine engine 40 and the nozzle 44, exterior or interior to the flexure ring 1. The seal strip 36 may be placed on the side of the flexure ring 1 which is adjacent to the highest speed gas flow. The seal strip 36 may prevent flow of air through the ring notches 12 between the adjacent ring fingers 3 of the flexure ring 1. The seal strip 36 can be attached to the turbine engine 40 and the nozzle 44 using fasteners (not shown) and/or suitable alternative attachment technique.

During operation of the turbine engine 40, exhaust gases 52 (FIG. 5) are ejected from the turbine engine 40 and the nozzle 44, respectively. The relatively high CTE mount structure 41 on the turbine engine 40 may thermally expand relative to the relatively low CTE engine mount structure 46 on the nozzle 44. The ring fingers 3 of the flexure ring 1 facilitate radial and axial expansion of the mount structure 41 on the turbine engine 40 relative to the mount structure 46 on the nozzle 44 without the application of thermally-induced stresses to the nozzle 44. The flexure ring 1 is capable of withstanding shear loads directed at right angles with respect to the center axis of the flexure ring 1 as well as fore and aft loads which are directed parallel to the central axis of the flexure ring 1. Therefore, thermal stresses between the high CTE nozzle 44 and the low CTE turbine engine 40 during thermal cycling is minimized, thus substantially preventing any possible change in the typically ceramic low CTE nozzle 44.

Referring next to FIGS. 7 and 8, embodiments of the disclosure may be used in the context of an aircraft manufacturing and service method 78 as shown in FIG. 7 and an aircraft 94 as shown in FIG. 8. During pre-production, exemplary method 78 may include specification and design 80 of the aircraft 94 and material procurement 82. During production, component and subassembly manufacturing 84 and system integration 86 of the aircraft 94 takes place. Thereafter, the aircraft 94 may go through certification and delivery 88 in order to be placed in service 90. While in service by a customer, the aircraft 94 is scheduled for routine maintenance and service 90 (which may also include modification, reconfiguration, refurbishment, and so on).

Each of the processes of method 78 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, the aircraft 94 produced by exemplary method 78 may include an airframe 98 with a plurality of systems 96 and an interior 100. Examples of high-level systems 96 include one or more of a propulsion system 102, an electrical system 104, a hydraulic system 106, and an environmental system 108. Any number of other systems may be included. Although an aerospace example is shown, the principles of the disclosure may be applied to other industries, such as the automotive industry.

The apparatus embodied herein may be employed during any one or more of the stages of the production and service method 78. For example, components or subassemblies corresponding to production process 84 may be fabricated or manufactured in a manner similar to components or subassemblies produced while the aircraft 94 is in service. Also, one or more apparatus embodiments may be utilized during the production stages 84 and 86, for example, by substantially expediting assembly of or reducing the cost of an aircraft 94. Similarly, one or more apparatus embodiments may be utilized while the aircraft 94 is in service, for example and without limitation, to maintenance and service 92.

Although this disclosure has been described with respect to certain exemplary embodiments, it is to be understood that the specific embodiments are for purposes of illustration and not limitation, as other variations will occur to those of ordinary skill in the art.

What is claimed is:

1. A flexure ring for a propulsion system having an engine and a nozzle, the flexure ring comprising:
    a ring body configured to be attached to the engine, the ring body having a first ring body edge and a generally scalloped second ring body edge opposing the first ring body edge; and
    a plurality of spaced-apart ring fingers configured to be attached to the nozzle, the ring fingers protruding from the second ring body edge, each of the ring fingers having a distal end and a proximal end, each of the ring fingers having a first flexure adjacent the distal end and a second flexure adjacent the proximal end to define a middle finger portion therebetween, wherein the middle finger portion of each of the ring fingers has a thickness that is greater than a thickness of the distal end having the first flexure and the proximal end having the second flexure.

2. The flexure ring of claim 1, wherein each of the ring fingers comprises a finger body extending from the ring body.

3. The flexure ring of claim 2, wherein the finger body is disposed at a generally 180-degree angle with respect to the ring body.

4. The flexure ring of claim 1, further comprising a plurality of ring notches positioned between the ring fingers.

5. The flexure ring of claim 1, wherein the first ring body edge of the ring body has a generally straight configuration.

6. The flexure ring of claim 1, further comprising at least one finger fastener opening provided in each of the ring fingers.

7. A flexure ring for a propulsion system having an engine and a nozzle, the flexure ring comprising:
a ring body configured to be attached to the engine, the ring body having a generally straight first ring body edge and an opposing generally scalloped second ring body edge;
a ring flange extending from the first ring body edge;
a plurality of spaced-apart ring fingers configured to be attached to the nozzle, the ring fingers protruding from the second ring body edge, each of the ring fingers defines a finger body extending from the ring body, the finger body defining a proximal edge, a distal edge and a pair of side finger edges, the pair of side finger edges having a generally curved shape, the finger body having a middle finger portion positioned between the distal and proximal edges that includes a thickness that is greater than a thickness of the distal edge and a thickness of the proximal edge;
a plurality of ring notches positioned between the ring fingers; and
at least one base flexure line provided between the finger body and the ring body, the base flexure line to provide a curved transition between the middle finger portion and a recess positioned between the middle finger portion and the ring body.

8. The flexure ring of claim 7, wherein the at least one base flexure line is provided at an attachment point between the ring body and the middle finger portion.

9. The flexure ring of claim 7, further comprising at least one finger body flexure line provided in the finger body.

10. The flexure ring of claim 7, wherein the finger body is disposed at a generally 180-degree angle with respect to the ring body.

11. The flexure ring of claim 7, wherein the ring flange is disposed in generally perpendicular relationship with respect to the ring body.

12. The flexure ring of claim 7, further comprising at least one fastener opening provided in each of the ring fingers and a plurality of flange fastener openings provided in the ring flange.

13. The flexure ring of claim 7, wherein each of the ring fingers has a finger bevel extending between the distal finger edge and each corresponding side finger edge.

14. A propulsion system, comprising:
an engine;
a nozzle; and
a flexure ring including a ring body having a first ring body edge attached to the engine and an opposing generally scalloped second ring body edge having a plurality of spaced-apart ring fingers protruding from the second ring body edge and attached to the nozzle, each of the ring fingers having a first finger flexure positioned adjacent a first end of the ring finger and a second finger flexure positioned adjacent a second end of the ring finger to define a ring finger portion between the first and second ends, the ring finger portion having a thickness greater than each of the first and second finger flexures, each of the ring fingers having a pair of side finger edges having a generally curved shape, a first curved side finger edge of a first ring finger and a second curved side finger edge of a second ring finger define at least a portion of a distance between first and second ring fingers that spaces the first and second ring fingers apart.

15. The propulsion system of claim 14, wherein each of the ring fingers comprises a finger body extending from said ring body.

16. The propulsion system of claim 15, further comprising at least one finger body flexure line provided in the finger body and at least one base flexure line provided at an attachment point between the ring body and the finger body.

17. The propulsion system of claim 15, wherein the finger body is disposed at a generally 180-degree angle with respect to the ring body.

18. The propulsion system of claim 14, further comprising a ring flange extending from the first ring body edge of the ring body and wherein the ring flange is attached to the engine.

19. The propulsion system of claim 18, further comprising at least one finger fastener opening provided in each of the ring fingers; at least one finger fastener extending through the at least one finger fastener opening and attached to said nozzle; a plurality of flange fastener openings provided in the ring flange; and a plurality of flange fasteners extending through the plurality of flange fastener openings, respectively, and attached to the engine.

20. The propulsion system of claim 14, wherein the first finger flexure is defined by a first recess and the second finger flexure is defined by a second recess.

* * * * *